United States Patent
Martin et al.

(10) Patent No.: US 12,165,045 B2
(45) Date of Patent: Dec. 10, 2024

(54) HARDWARE IMPLEMENTATION OF A DEEP NEURAL NETWORK WITH VARIABLE OUTPUT DATA FORMAT

(71) Applicant: Imagination Technologies Limited, Kings Langley (GB)

(72) Inventors: Chris Martin, Leighton Buzzard (GB); David Hough, Watford (GB); Paul Brasnett, West Molesey (GB); Cagatay Dikici, London (GB); James Imber, Hemel Hempstead (GB); Clifford Gibson, Wheathampstead (GB)

(73) Assignee: Imagination Technologies Limited, Kings Langley (GB)

( * ) Notice: Subject to any disclaimer, the term of this patent is extended or adjusted under 35 U.S.C. 154(b) by 1117 days.

(21) Appl. No.: 16/136,553

(22) Filed: Sep. 20, 2018

(65) Prior Publication Data

US 2019/0087718 A1 Mar. 21, 2019

(30) Foreign Application Priority Data

Sep. 20, 2017 (GB) ...................................... 1715215

(51) Int. Cl.
*G06N 3/065* (2023.01)
*G06F 1/3234* (2019.01)
(Continued)

(52) U.S. Cl.
CPC ........... *G06N 3/065* (2023.01); *G06F 1/3275* (2013.01); *G06F 7/483* (2013.01); *G06F 7/544* (2013.01);
(Continued)

(58) Field of Classification Search
CPC . G06F 17/16; G06N 3/02; G06N 3/04; G06N 3/08; G06N 3/0454; G06N 3/0481;
(Continued)

(56) References Cited

U.S. PATENT DOCUMENTS

| | | | |
|---|---|---|---|
| 11,227,086 B2 * | 1/2022 | Boesch | G06N 3/084 |
| 2016/0026912 A1 * | 1/2016 | Falcon | G06N 3/0454 |
| | | | 706/25 |

(Continued)

FOREIGN PATENT DOCUMENTS

| | | |
|---|---|---|
| CN | 106030622 A | 10/2016 |
| CN | 106105336 A | 11/2016 |
| CN | 106203619 A | 12/2016 |

OTHER PUBLICATIONS

Dikici, Cagatay, and H. Isil Bozma. "Video coding based on pre-attentive processing." Real-Time Imaging IX. vol. 5671. International Society for Optics and Photonics, 2005: 745-760 (Year: 2005).*

(Continued)

*Primary Examiner* — Randall K. Baldwin
(74) *Attorney, Agent, or Firm* — Potomac Law Group, PLLC; Vincent M DeLuca

(57) ABSTRACT

Hardware implementations of DNNs and related methods with a variable output data format. Specifically, in the hardware implementations and methods described herein the hardware implementation is configured to perform one or more hardware passes to implement a DNN wherein during each hardware pass the hardware implementation receives input data for a particular layer, processes that input data in accordance with the particular layer (and optionally one or more subsequent layers), and outputs the processed data in a desired format based on the layer, or layers, that are processed in the particular hardware pass. In particular, when a hardware implementation receives input data to be processed, the hardware implementation also receives information indicating the desired format for the output data of the hardware pass and the hardware implementation is (Continued)

configured to, prior to outputting the processed data convert the output data to the desired format.

20 Claims, 9 Drawing Sheets

(51) Int. Cl.
    *G06F 7/483*     (2006.01)
    *G06F 7/544*     (2006.01)
    *G06N 3/04*     (2023.01)
    *G06N 3/045*     (2023.01)
    *G06N 3/063*     (2023.01)

(52) U.S. Cl.
    CPC ............... *G06N 3/04* (2013.01); *G06N 3/045* (2023.01); *G06N 3/063* (2013.01); *G06F 2207/4824* (2013.01)

(58) Field of Classification Search
    CPC ...... G06N 3/063; G06N 3/0635; G11C 11/54; G11C 16/04; G11C 16/0425; H03F 2203/45524; H03F 3/45; H03F 3/45475; H03F 3/45269
    See application file for complete search history.

(56) References Cited

U.S. PATENT DOCUMENTS

| | | | | |
|---|---|---|---|---|
| 2016/0328645 | A1* | 11/2016 | Lin | G06N 3/063 |
| 2017/0061279 | A1* | 3/2017 | Yang | G06N 3/084 |
| 2017/0103298 | A1 | 4/2017 | Ling et al. | |
| 2017/0344876 | A1* | 11/2017 | Brothers | G06N 3/0454 |
| 2018/0189641 | A1* | 7/2018 | Boesch | G06N 3/084 |
| 2019/0042923 | A1* | 2/2019 | Janedula | G06N 3/063 |
| 2019/0147856 | A1* | 5/2019 | Price | G06N 3/063 704/232 |

OTHER PUBLICATIONS

Dikici, Çağatay, and H. Isil Bozma. "Attention-based video streaming." Signal Processing: Image Communication 25.10 (2010): 745-760. (Year: 2010).*

Xiao, Yeming, et al. "Speeding up deep neural network based speech recognition systems." Journal of Software 9.10 (2014): 2706-2712. (Year: 2014).*

Song, Lili, et al. "C-Brain: A deep learning accelerator that tames the diversity of CNNs through adaptive data-level parallelization." 2016 53nd ACM/EDAC/IEEE Design Automation Conference (DAC). IEEE, 2016: 1-6 (Year: 2016).*

Du, Li, et al. "A reconfigurable streaming deep convolutional neural network accelerator for Internet of Things." IEEE Transactions on Circuits and Systems I: Regular Papers 65.1 (Aug. 2017): 198-208. (Year: 2017).*

Ott, Joachim, et al. "Recurrent neural networks with limited numerical precision." arXiv preprint arXiv: 1608.06902 (Feb. 2017: 1-11) ( Year: 2017).*

Wu, Yonghui, et al. "Google's neural machine translation system: Bridging the gap between human and machine translation." arXiv preprint arXiv: 1609.08144 (2016): 1-23 (Year: 2016).*

Guo, Kaiyuan, et al. "Angel-eye: A complete design flow for mapping CNN onto embedded FPGA." IEEE transactions on computer-aided design of integrated circuits and systems 37.1 (May 2017): 35-47. (Year: 2017).*

Brown et al., "Neural Network Number Systems," International Joing Conference on Neural Networks, vol. 3, pp. 903-907, Jun. 1990.

* cited by examiner

HARDWARE IMPLEMENTATION OF A DEEP NEURAL NETWORK WITH VARIABLE OUTPUT DATA FORMAT

BACKGROUND

A Deep Neural Network (DNN) is a type of artificial neural network that can be used for machine learning applications. In particular, a DNN can be used in signal processing applications, including image processing and computer vision applications.

DNNs have been implemented in applications where power resources are not a significant factor. Despite this, DNNs have application in a number of different technical fields in which the resources of the hardware used to implement the DNNs is such that power consumption, processing capabilities, or silicon area are limited.

There is therefore a need to implement hardware that is configured to implement a DNN in an efficient manner, i.e. in a manner that requires less silicon area or less processing power when operating. Moreover, DNNs can be configured in a number of different ways for a variety of different applications. There is therefore also a need for hardware for implementing a DNN to be flexible to be able to support a variety of DNN configurations.

The embodiments described below are provided by way of example only and are not limiting of implementations which solve any or all of the disadvantages of known hardware implementations of deep neural networks.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are hardware implementations of DNNs and related methods with a variable output data format. Specifically, in the hardware implementations and methods described herein the hardware implementation is configured to, perform one or more hardware passes to implement a DNN wherein during each hardware pass the hardware implementation receives input data for a particular layer, processes that input data in accordance with the particular layer (and optionally one or more subsequent layers), and outputs the processed data in a desired format based on the layer, or layers, that are processed in the particular hardware pass. In particular, when a hardware implementation receives input data to be processed, the hardware implementation also receives information indicating the desired format for the output data of the hardware pass and the hardware implementation is configured to, prior to outputting the processed data convert the output data to the desired format.

A first aspect provides a method in a hardware implementation of a Deep Neural Network "DNN" configured to implement the DNN by processing data using one or more hardware passes, the method comprising: receiving a set of input data for a hardware pass of the hardware implementation, the set of input data representing at least a portion of input data for a particular layer of the DNN; receiving information indicating a desired output data format for the hardware pass; processing the set of input data according to one or more layers of the DNN associated with the hardware pass to produce processed data, the one or more layers comprising the particular layer of the DNN; and converting the processed data into the desired output data format for the hardware pass to produce output data for the hardware pass.

A second aspect provides a hardware implementation of a Deep Neural Network "DNN" configured to implement the DNN by processing data using one or more hardware passes, the hardware implementation comprising: an input module configured to receive a set of input data for a hardware pass of the hardware implementation, the set of input data representing at least a portion of input data for a particular layer of the DNN; a decoder configured to receive information indicating a desired output data format for the hardware pass; a processing module configured to process the set of input data according to one or more layers of the DNN associated with the hardware pass to produce processed data, the one or more layers comprising the particular layer of the DNN; and an output module configured to convert the processed data into the desired output data format for the hardware pass to produce output data for the hardware pass.

The hardware implementation of a DNN may be embodied in hardware on an integrated circuit. There may be provided a method of manufacturing, at an integrated circuit manufacturing system, the hardware implementation of a DNN. There may be provided an integrated circuit definition dataset that, when processed in an integrated circuit manufacturing system, configures the system to manufacture the hardware implementation of a DNN. There may be provided a non-transitory computer readable storage medium having stored thereon a computer readable description of a hardware implementation of a DNN that, when processed in an integrated circuit manufacturing system, causes the integrated circuit manufacturing system to manufacture an integrated circuit embodying a hardware implementation of a DNN.

There may be provided an integrated circuit manufacturing system comprising: a non-transitory computer readable storage medium having stored thereon a computer readable description of the hardware implementation of a DNN; a layout processing system configured to process the computer readable description so as to generate a circuit layout description of an integrated circuit embodying the hardware implementation of a DNN; and an integrated circuit generation system configured to manufacture the hardware implementation of a DNN according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
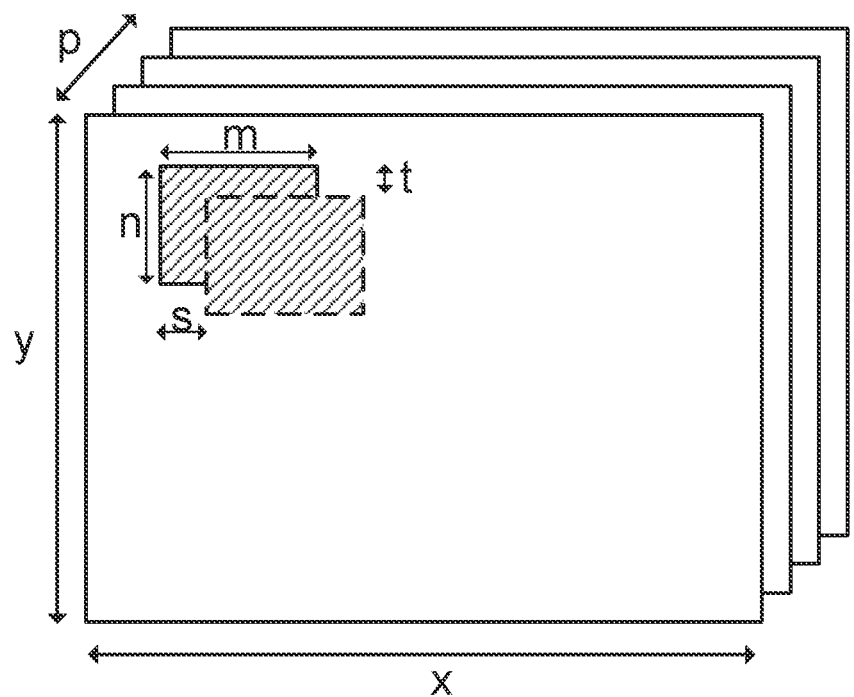
FIG. 1 is a schematic diagram of example data in a DNN.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A Deep Neural Network (DNN) is a form of artificial neural network comprising a plurality of cascaded layers that enable the DNN to perform signal processing tasks, including, but not limited to, computer vision tasks. Each layer receives input data, processes the input data in accordance with the layer to produce output data, which is provided to the next layer as the input data or is output as the final output of the DNN. Accordingly, the first layer receives the original input data to the DNN (e.g. an image) as the input data. All other layers receive the output data from the previous layer (which may also be referred to as intermediate data) as the input data.

The processing that is performed on the input data of a layer is based on the type of layer. For example, each layer of a DNN may be one of a plurality of different types. Example DNN layer types include, but are not limited to: a convolution layer, an activation layer, a normalisation layer, and a pooling layer. It will be evident to a person of skill in the art that these are example DNN layer types and that this is not an exhaustive list and there may be other DNN layer types. For a convolution layer the input data is processed by convolving the input data using weights associated with that layer. Specifically, each convolution layer is associated with a plurality of weights $w_0 \ldots w_n$ which also may be referred to as filter weights or coefficients. The weights may be grouped to form or define one or more filters.

Reference is made to FIG. 1 which illustrates an example overview of the format of data utilised in a DNN. As can be seen in FIG. 1, the format of data used in a DNN may be formed of a plurality of planes. The input data may be arranged as P planes of data, where each plane has a dimension x×y. A DNN may comprise one or more convolution layers each of which has associated therewith a plurality of filters formed by a plurality of weights $w_0 \ldots w_n$. The filters ($w_0 \ldots w_n$) each have a dimension m×n×P and are applied to the input data according to a convolution operation across several steps in direction s and t, as illustrated in FIG. 1.

The number and value of filter weights may vary between convolution layers such that for a first convolution layer, the number of weights may be defined as $w_0^1 \ldots w_{n1}^1$ and for a second convolution layer, the number of weights may be defined as $w_0^2 \ldots w_{n2}^2$, where the number of weights in the first convolution layer is n1 and the number of weights in the second convolution layer is n2. A convolutional neural network (CNN), which is a specific type of DNN that is very effective for image recognition and classification, generally comprises a plurality of convolution layers. The first layer of a CNN is typically, but not necessarily, a convolution layer.

An activation layer, which typically, but not necessarily follows a convolution layer, performs one or more activation functions on the input data. An activation function (or non-linearity) takes a single number and performs a certain fixed mathematical operation on it. In some examples, an activation layer may act as rectified linear unit (ReLU) by implementing an ReLU function (e.g. $f(x)=\max(0,x)$) or a Parametric Rectified Linear Unit (PReLU) by implementing a PReLU function. A normalisation layer is configured to perform a normalizing function, such as a Local Response Normalisation (LRN) Function on the input data. A pooling layer, which is typically, but not necessarily inserted between successive convolution layers, performs a pooling function on the input data such as a max or mean function. The purpose of a pooling layer is thus to reduce the spatial size of the representation to reduce the number of parameters and computation in the network, and hence to also control overfitting.

An example DNN may comprise the following layers: a first convolution layer, a first activation layer, a second convolution layer, a second activation layer, a pooling layer, a third convolution layer, a third activation layer, and another pooling layer. It will be evident to a person of a skill in the art that this is an example only and other DNNs may comprise a different number of layers and a different combination of layer types.

A hardware implementation for a DNN may be configured to compute the output of a DNN through a series of hardware passes (which also may be referred to as processing passes) wherein during each pass the hardware implementation receives at least a portion of the input data for a layer of the DNN and processes the received input data in accordance with that layer (and optionally in accordance with one or more following layers) to produce processed data. The processed data is either output to memory for use as input data for a subsequent hardware pass or output as the output of the DNN. The number of layers that the hardware implementation can process during a single hardware pass may be based on the size of the data, the hardware implementation and the order of the layers. For example, where the hardware implementation comprises hardware to perform each of the possible layer types a DNN that comprises a first convolution layer, a first activation layer, a second convolution layer, a second activation layer, and a pooling layer may be able to receive the initial DNN input data and process that input data according to the first convolution layer and the first activation layer in the first hardware pass and then output the output of the activation layer into memory, then in a second hardware pass receive that data from memory as the input and process that data according to the second convolution layer, the second activation layer, and the pooling layer to produce the output data for the DNN. Since the size of the output data for each hardware pass can be quite large it is desirable to reduce the size of the output data to reduce the memory bandwidth. It is also desirable to reduce the size of data within a hardware pass so as to reduce the requirements on the hardware size.

The inventors have identified that the range of values in the output data that will be produced typically varies per layer. As such, using a single output data format for all output data independent of the layer (or layers) to which the output data relates may be inappropriate for use in hardware implementations for DNNs since use of a single output data format may result in redundant bits in the output data for some layers. For example, if the output data for a first layer is between the range of 0 and 31 and the output data for a second layer is between the range of −7 and 253 then a 5-bit unsigned integer would be sufficient to represent the output data for the first layer, and a 9-bit signed integer (one sign bit plus 8 integer bits) would be sufficient to represent the output data for the second layer. Thus if 9 bits were used to represent all output data values then 4 bits would be wasted for each output data value for the first layer as the most significant 4 bits (assuming the sign bit is the most significant bit) would not convey any useful information for the first layer.

Accordingly, described herein are hardware implementations of DNNs and related methods with a variable output data format. Specifically, in the hardware implementations and methods described herein the hardware implementation is configured to perform one or more hardware passes to implement a DNN wherein during each hardware pass the hardware implementation receives a set of input data for that hardware pass which represents at least a portion of input data for a particular layer, processes that set of input data in accordance with one or more layers associated with the hardware pass (which includes the particular layer (and optionally one or more subsequent layers)), and outputs the processed data in a desired format based on the layer, or layers, that are processed in the particular hardware pass. In particular, when a hardware implementation receives the set of input data to be processed, the hardware implementation also receives information indicating the desired format for the output data of the hardware pass and the hardware implementation is configured to, prior to outputting the processed data, convert the processed data to the desired format. As described in more detail below, the appropriate format for the output data for each hardware pass may be determined empirically based on the one or more layers associated with the hardware pass. A hardware pass is said to be associated with a layer if that layer will be processed, or partially processed in the hardware pass.

Using an appropriate format for each hardware pass independently allows the memory bandwidth for a system that includes the hardware implementation to be significantly reduced while still retaining sufficient calculation accuracy across the whole DNN. Reducing the memory bandwidth also may result in a system with a smaller area footprint, may reduce the power consumed by the memory, and may improve the performance of the hardware implementation (which may have been otherwise slowed down due to a large network bandwidth).

In some cases, the internal data used by the hardware implementation to process the received set of input data may also have a variable format. For example, in some cases, in addition to receiving, for a set of input data for a hardware pass, information indicating the format of the corresponding output data, the hardware implementation may also receive information indicating the desired internal format of input data and/or output data for one or more of the layers associated with the hardware pass. The hardware implementation may then be configured to perform a conversion of the input data for that layer to the desired format of input data prior to processing the data and/or perform a conversion of the output data to the desired output data format before passing the output data for that layer to the next layer or prior to converting the output data to the desired output data format. This may allow the processing for a layer to be performed more efficiently. For example, if a DNN comprises a convolution layer, and a pooling layer which can be completed in a single hardware pass, in addition to receiving information indicating the format of the output data of the hardware pass (i.e. the output of the data of the pooling layer) the hardware implementation may receive information indicating the desired internal input data format and/or the desired internal output data format for the convolution layer and/or the pooling layer.

Figure 2:
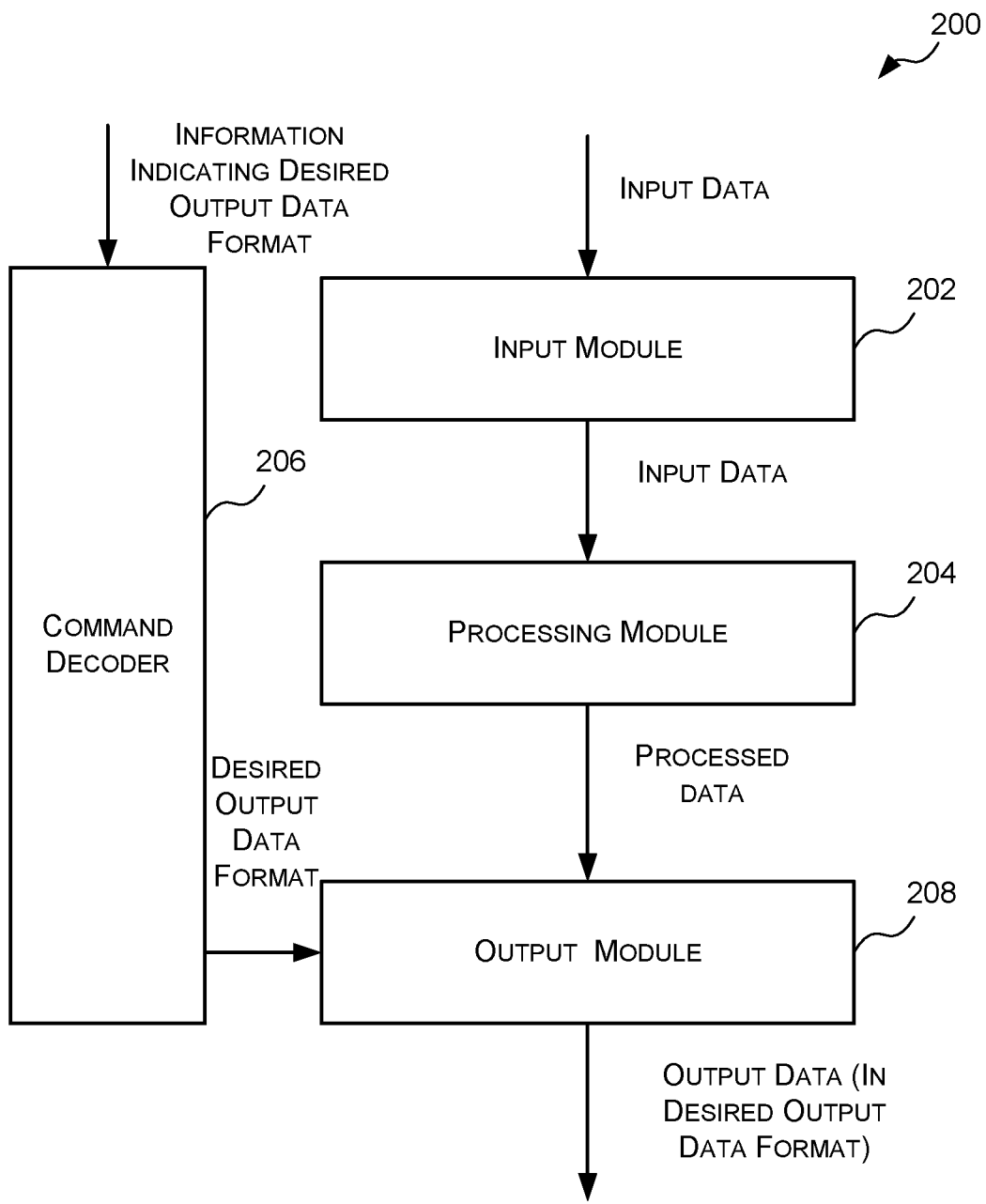
FIG. 2 is a block diagram of an example hardware implementation of a DNN with a variable output data format.

Reference is now made to FIG. 2 which illustrates an example hardware implementation of a DNN 200 which has a variable output data format. The hardware implementation of the DNN 200 is configured to receive input data for a particular DNN and process the input data to implement that DNN. The phrase "process the input data to implement a DNN" is used herein to mean that the input data is processed in accordance with the layers (i.e. the order and configuration thereof) of the DNN. In the examples described herein the hardware implementation 200 is configured to process data for a DNN using one or more hardware passes wherein in each hardware pass the hardware implementation processes the input data in accordance with one or more layers of the DNN and either outputs the processed data as the output of the DNN or provides the output data as input to a subsequent hardware pass. The hardware implementation 200 may be preconfigured to implement a particular DNN (e.g. the order of the layers and the configuration thereof (e.g. the weights of the convolution layers) may be pre-loaded into the DNN) or the hardware implementation 200 can be dynamically configured to implement one of a plurality of different DNNs (e.g. the order of the layers and the configuration thereof (e.g. the weights for the convolution layers) may be dynamically provided to the hardware implementation).

The example hardware implementation 200 comprises an input module 202, a processing module 204, a command decoder 206, and an output module 208.

The input module 202 comprises digital logic circuitry configured to receive a set of input data for a hardware pass and provide the received set of input data to the processing module 204 for processing. A set of input data may represent a portion of the input data for a particular layer or all of the input data for a particular layer. Whether or not the input data comprises all, or only a portion of the input data, for a particular layer may be dependent on the size of the input data and/or the size of the input module 202. For example, in some cases the input module 202 may comprise one or more input buffers for storing the received input data. Where the input data for a layer is larger than the size of the input buffer(s) then the input data for the layer may be divided into multiple sets of input data wherein each set of input data is processed in a different hardware pass. This means that it may take more than one hardware pass to process a layer of the DNN, and, that more than one hardware pass may be associated with the same layer.

The input data for a particular layer may be divided into a multiple sets of input data in any suitable manner. For example, the input data for a particular layer of a DNN may be split into multiple sets of input data (i) in the x dimension such that each set relates to one or more vertical strips; (ii) by output planes (e.g. $f$ dimension) so that each set relates to a subset of the filters; (iii) by input plane (e.g. p dimension) so that each set each filter is part processed; or (iv) using any combination thereof.

In some cases, the input module 202 may be configured to read the input data from external memory (not shown) via a memory interface (not shown). As is known to a person of skill in the art a memory interface is configured to provide an interface between the hardware implementation 200 and external memory. The external memory may be considered a separate module to the hardware implementation 200 or may be part of the hardware implementation 200. In some cases, the input module 202 may be preconfigured with the addresses of external memory for the input data for each hardware pass. In other cases, the input module 202 may be configured to dynamically receive information indicating the address of external memory for the input data for each hardware pass.

The processing module 204 comprises digital logic circuitry configured to process the received set of input data in accordance with one or more layers associated with the hardware pass to generate processed data. The one or more layers associated with the hardware pass comprises the layer to which the input data to the hardware layer related and none, one or more than one subsequent layer. Accordingly, the processing that is performed is dependent on the number and type of layers associated with the current hardware pass. For example, if the hardware pass is associated with a convolution layer then the processing module 204 may be configured to perform a convolution of the input data with the filters/weights associated with the convolution layer; and if the hardware pass is associated with a convolution layer and an activation layer then the processing module 204 may be configured to perform a convolution of the input data with the filter/weights associated with the convolution layer, and then apply an activation function to the output of the convolution.

The number and type of layers that each hardware pass is associated with are typically predetermined and may be based on the order of layers and one or more other factors. For example, in some cases the processing module 204 may be configured to process a single layer per hardware pass unless the processing in accordance with a subsequent layer or layers can be performed without writing the data of an earlier layer out to memory in between. In some cases, the processing module 204 may be preconfigured with information indicating the layer(s) (and thus which processing function(s)) each hardware pass is associated with. In other cases, the processing module 204 may be configured to dynamically receive information indicating which layer(s) (and thus which processing function(s)) each hardware pass is associated with.

In some cases, the processing module 204 may comprise a plurality of sub-processing modules each of which is configured to perform all or part of the processing of one type of layer. For example, the processing module 204 may comprise one or more of the following sub-processing modules: a convolution engine configured to perform convolutions on the input data, an activation module configured to apply an activation function to received data, one or more pooling modules to perform pooling of received data etc. An example implementation of a processing module 204 is described below with reference to FIG. 3. Once the input data has been processed in accordance with the layers associated with the current hardware pass the processed data is provided to the output module 208 or is stored for use in a subsequent hardware pass.

The command decoder 206 comprises digital logic circuitry configured to receive information indicating the desired format of the output data for the current hardware pass. The command decoder 206 identifies the desired format of the output data for the current hardware pass from the received information and provides the format to the output module 208. In some cases, the command decoder 206 (or another component of the hardware implementation 200) may be configured to retrieve the information indicating the format of the output data for the current hardware pass from external memory (not shown) via a memory interface (not shown). In other cases, the command decoder 206 may be configured to retrieve the information indicating the format of the output data for the current hardware pass from internal memory of the hardware implementation or another type of storage (e.g. register) which may be pre-loaded with the information indicating the desired format of the output data for each hardware pass.

In some cases, one or more software tools may be used (e.g. during a training phase of the DNN, or, during a mapping phase when the DNN layers are being mapped to hardware passes) to determine an appropriate or optimum output data format for each hardware pass. This may comprise identifying an appropriate or optimum data format for one or more of the layers associated with the hardware pass. For example, in some cases determining an appropriate or optimum output data format for a hardware pass may comprise identifying an appropriate or optimum output data format for the last layer associated with the hardware pass (i.e. the layer that will be processed last in the hardware pass). For example, if a hardware pass is associated with layer a, layer b and layer c which are to be processed in the listed order then determining the optimum data format for the hardware pass may comprise determining an appropriate or optimum data format for layer c. Since the optimum output data format may be different between layers the optimum data format may be different between hardware passes.

An appropriate or optimum data format for a particular layer (e.g. the last layer associated with the hardware pass) may be determined in any suitable manner. For example, in some cases a training data set or known sample of typical inputs may be run through the DNN and the minimum and maximum values of the output data of each layer are recorded and used to identify the appropriate or optimum format to represent the range of values defined by the minimum and maximum values. Where the DNN is to be used for vision applications, the input data used to estimate the distribution may take the form of sample input images. Such a method works particularly well when the sample input images comprise a good representative of the expected input data.

As described above, in some cases (e.g. when the input data to a layer is too large to be processed in a single hardware pass) a layer may be processed over multiple hardware passes. In these cases, one or more hardware passes may only relate to a portion of a layer (e.g. a portion of the input data) and thus only the output data related to that portion of the layer may be used in identifying an appropriate or optimum output data format for the hardware pass.

This may result in two hardware passes that are associated with the same layer having different desired output data formats.

The output data format for a hardware pass may be a floating point format or a fixed point format. The software tool may determine whether the output data format for a particular layer (and thus for a particular hardware pass) is to be a floating point format or a fixed point format based on, for example, the destination of the output data. As described in more detail below, in some cases it may be advantageous to perform the DNN processing using a fixed point format. In these cases, if the output data for a particular layer is to be fed back into the DNN (e.g. as the input to another layer or as input to another hardware pass) then the software tool may identify a fixed point format as the optimum data format for the output data. In contrast, if the output data of a layer is to be fed to another module, such as a central processing unit (CPU) or graphics processing unit (GPU) because, for example, the output data is the ultimate output data of the DNN, then the software tool may identify a floating point format as the appropriate or optimum data format for the output data.

As is known to those skilled in the art, a fixed point format has a fixed number of digits after the radix point (e.g. decimal point or binary point). In contrast, a floating point number representation does not have a fixed radix point (i.e. it can "float"). In other words, the radix point can be placed anywhere within the representation.

The most common floating point standard is the Institute of Electrical and Electronics Engineers (IEEE) standard for floating-point arithmetic (IEEE-754). IEEE-754 specifies that floating point numbers are represented by three numbers: sign, exponent and mantissa (s, exp, mant). In general the three numbers (s, exp, mant) are interpreted, for a fixed integer bias, as shown in equation (1):

$$(-1)^s 2^{exp-bias} 1.mant \quad (1)$$

IEEE-754 defines the four basic formats shown in Table 1 for floating point numbers with varying degrees of precision. In particular, they are encoded with 16, 32, 64 and 128 bits respectively.

TABLE 1

| Type | Name | Sign Width | Exponent Width (ew) | Mantissa Width (mw) | Bias $2^{ew-1} - 1$ | Roundoff Error (u) |
|---|---|---|---|---|---|---|
| Half | F16 | 1 | 5 | 10 | 15 | $2^{-11}$ |
| Single | F32 | 1 | 8 | 23 | 127 | $2^{-24}$ |
| Double | F64 | 1 | 11 | 52 | 1023 | $2^{-53}$ |
| Quad | F128 | 1 | 15 | 112 | 16383 | $2^{-113}$ |

In some cases, where the output format for a hardware pass is a floating point format an appropriate or optimum floating point format for the hardware pass may be selected to be the lowest IEEE floating point format (F16, F32, F64 or F128) that can be used to represent the range of output values expected for the hardware pass.

A common format for representing a number in a fixed point format is the Q format, which specifies a predetermined number of integer bits n and fractional bits m. Accordingly, a number can be represented as Qn. m which requires a total of n+m+1 bits (including the sign bit). Example Q formats are illustrated in Table 2 below.

TABLE 2

| Q Format | Description | Example |
|---|---|---|
| Q4.4 | 4 integer bits and 4 fractional bits | $0110.1110_2$ |
| Q0.8 | 0 integer bits and 8 fractional bits | $.01101110_2$ |

However, the Q format has a shortcoming in that some of the bits used to represent the number may be considered to be redundant. In an example, a number range [−0.125, 0.125) is to be represented to a precision of 3 bits. The required Q format for this example range and precision is Q0.5. However, if we assume that the range of values is known in advance, the first two bits of the number will never be used in determining the value represented in Q format. For example, the first two bits of the representation do not contribute to the final number since they represent 0.5 and 0.25 respectively and therefore fall outside of the required range. However, they are used to indicate the value of the third bit position (i.e. 0.125 and beyond) due to the relative bit positions. The Q format described above is an inefficient fixed point format for use within a hardware implementation of a DNN since some bits may not convey useful information.

Accordingly, in some examples instead of using the Q format a signed integer mantissa and common fixed power of two exponent format may be used. This fixed point format is defined by the number of integer bits and the exponent. In some cases, the signed integer may be represented in two's complement format, and in other cases other signed integer formats may be used. Where an integer/common exponent fixed point format is used for the output data for a particular hardware pass then an appropriate or optimum fixed point format for that hardware pass may comprise identifying the appropriate exponent and smallest integer bit-length combination which can be used to represent the range of output data values expected for that hardware pass.

In some cases, instead of there being a single desired output data format for a hardware pass (i.e. all of the processed data may not be converted to the same output format), there may be multiple desired output data formats for a hardware pass. Specifically, in some cases there may be multiple desired output data formats which related to different portions of the processed data. In these cases, the information indicating the desired output hardware format may indicate a different output data format for at least two different portions of the processed data.

The output module 208 is configured to receive the processed data from the processing module 204 and convert the processed data to the desired output data format to produce output data. The processed data is typically (but not necessarily) in a fixed point format and thus depending on whether the desired output data format is a floating point format or a fixed point format the output module 208 may be configured to perform a fixed point to floating point conversion, or a fixed point to fixed point conversion. In some cases, the output module 208 may also be configured to write the output data to memory (not shown) or another storage module (not shown). Where there are multiple desired output data formats for the hardware pass then the output module 208 may be configured to perform multiple format conversions such that different portions of the processed data are converted into different desired output data formats.

In some cases, in addition to supporting a variable output data format, the hardware implementation 200 may also support a variable weight format. As described above, some layers, such as convolution layers, may be associated with a set of weights or coefficients which are used to process the input data to the layer. The specific weights, and thus the range of weight values, vary between layers, so, for similar reasons to that described above in relation to output data, it may not be efficient to use a standard format for all weights because it may result in redundant bits for the weights for some layers. Accordingly, different formats may be used for the weights of different layers.

Weights are traditionally represented using a floating point format, but, as described above, processing floating point numbers in hardware is complex which tends to increase the silicon area and complexity of the hardware compared to hardware that processes fixed point numbers. As a result, it may be more efficient to represent the weights using a fixed point format. In some cases, a fixed point format defined by an exponent and an integer bit-length may be used. In these cases, the exponent and/or integer bit-length used to represent the weights may vary by layer. For example, the weights of a first convolution layer may be in a fixed point format defined by exponent A and integer bit-length B and the weights of a second convolution layer may be in a fixed point format defined by exponent C and integer bit-length D. Allowing different layers to use different formats for the weights can reduce the amount of space used to store the weights and can allow the processing of such layers to be performed more efficiently.

In some cases, the weights associated with a layer are grouped to form a plurality of filters. In these cases, in addition to allowing different layers to use different weight formats, the weight format may vary within a layer (e.g. between filters). For example, a convolution layer may be associated with a set of weights which are grouped to form a first filter and a second filter, and a first format may be used for the weights of the first filter and a second different format may be used for the weights of the second filter. This may allow more bits to be allocated to the filters that are more important to the accuracy of the result.

Where the hardware implementation supports a variable weight format software (which may be the same software, or different software, to that used to identify the appropriate or optimum output data format for each hardware pass) may be configured to determine an appropriate or optimum format (or formats) for the weights of each relevant layer (i.e. each layer with associated weights, such as a convolution layer). Specifically, the software may determine an appropriate or optimal single weight format for all weights of a layer, or an appropriate or optimal weight format for each filter of the layer. Information indicating the weight format(s) used by a particular layer is then provided to the hardware implementation to allow the hardware implementation to process the weights correctly. In some cases, the information indicating the weight formats for each such layer (e.g. each convolution layer) may be stored in memory which is read by the hardware implementation. In other cases, the information indicating the weight formats may be stored locally with respect to the hardware implementation (e.g. in a register) or dynamically provided to the hardware implementation in another manner.

Figure 3:
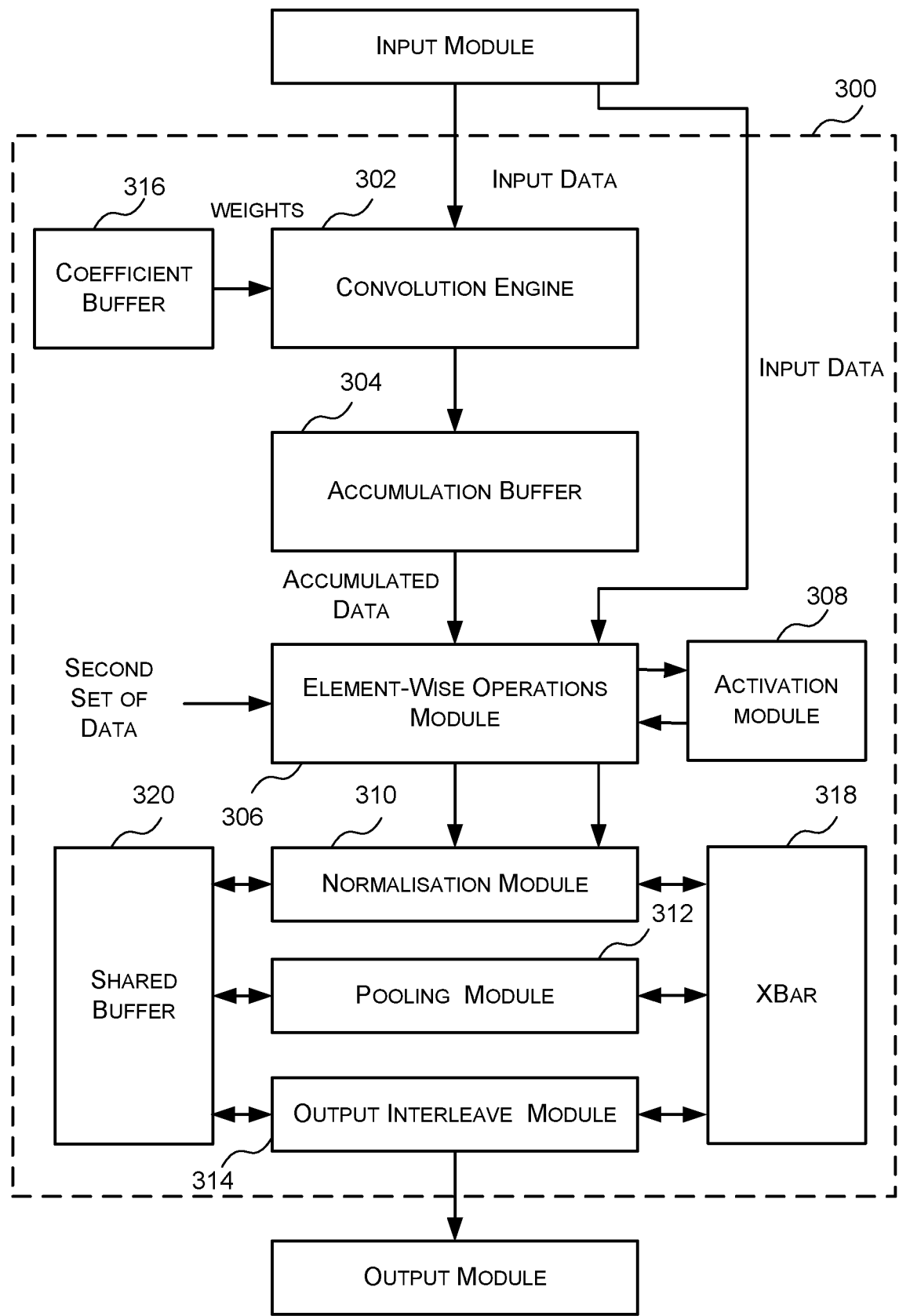
FIG. 3 is a block diagram of an example processing module of the hardware implementation of a DNN in FIG. 2.

Reference is now made to FIG. 3 which illustrates an example processing module 300 which may be used as the processing module 204 of FIG. 2. The example processing module 300 of FIG. 3 comprises a convolution engine 302, an accumulation buffer 304, an element-wise operations module 306, an activation module 308, a normalisation module 310, a pooling module 312 and an output interleave module 314. Each module or engine implements or processes all or a portion of at least one type of layer. Specifically, together the convolution engine 302 and the accumulation buffer 304 can implement or process a convolution layer. The activation module 306 processes or implements an activation layer. The normalisation module 310 processes or implements a normalisation layer. The pooling module 312 implements a pooling layer and the output interleave module 314 processes or implements an interleave layer.

The convolution engine 302 is configured to perform a convolution operation on the received input data using the weights associated with a particular convolution layer. The weights for each convolution layer of the DNN may be stored in a coefficient buffer 316 as shown in FIG. 3 and the weights for a particular convolution layer may be provided to the convolution engine 302 when that particular convolution layer is being processed by the convolution engine 302. Where the hardware implementation supports variable weight formats then the convolution engine 302 may be configured to receive information indicating the format or formats of the weights of the current convolution layer being processed to allow the convolution engine to properly interpret and process the received weights.

Figure 4:
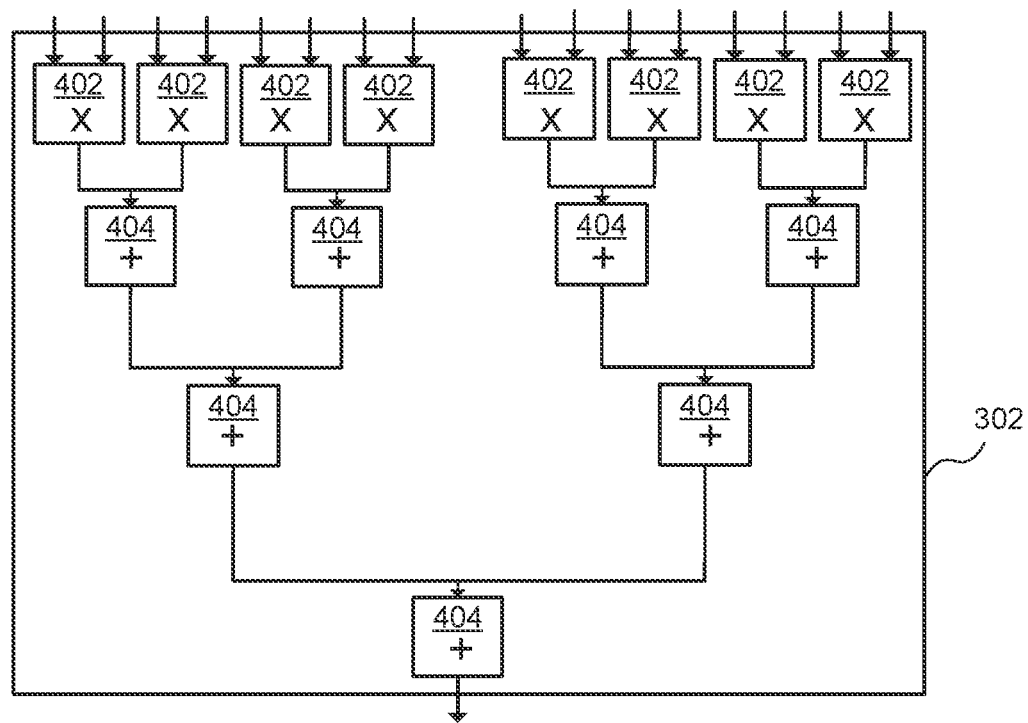
FIG. 4 is a block diagram of an example convolution engine of FIG. 3.

The convolution engine 302 may comprise a plurality of multipliers (e.g. 128) and a plurality of adders which add the result of the multipliers to produce a single sum. An example implementation of a convolution engine 302 is shown in FIG. 4 which comprises a plurality of multipliers 402 and a plurality of adders 404. Although a single convolution engine 302 is shown in FIG. 3, in other examples there may be multiple (e.g. 8) convolution engines so that multiple windows can be processed simultaneously. The output of the convolution engine 302 is fed to the accumulation buffer 304.

The accumulation buffer 304 is configured to receive the output of the convolution engine and add it to the current contents of the accumulation buffer 304. In this manner, the accumulation buffer 304 accumulates the results of the convolution engine 302. Although a single accumulation buffer 304 is shown in FIG. 3, in other examples there may be multiple (e.g. 8, one per convolution engine) accumulation buffers. The accumulation buffer 304 outputs the accumulated result to the element-wise operations module 306 which may or may not operate on the accumulated result depending on whether an element-wise layer is to be processed during the current hardware pass.

The element-wise operations module 306 is configured to receive either the input data for the current hardware pass (e.g. when a convolution layer is not processed in the current hardware pass) or the accumulated result from the accumulation buffer 304 (e.g. when a convolution layer is processed in the current hardware pass). The element-wise operations module 306 may either process the received input data or pass the received input data to another module (e.g. the activation module 308 and/or or the normalisation module 310) depending on whether an element-wise layer is processed in the current hardware pass and/or depending whether an activation layer is to be processed prior to an element-wise layer. When the element-wise operations module 306 is configured to process the received input data the element-wise operations module 306 performs an element-wise operation on the received data (optionally with another data set (which may be obtained from external memory)). The element-wise operations module 306 may be configured to perform any suitable element-wise operation such as, but not limited to add, multiply, maximum, and minimum. The result of the element-wise operation is then provided to either the activation module 308 or the normalisation module 310 depending on whether an activation layer is to be processed subsequent the element-wise layer or not.

The activation module 308 is configured to receive one of the following as input data: the original input to the hardware pass (via the element-wise operations module 306) (e.g. when a convolution layer is not processed in the current hardware pass); the accumulated data (via the element-wise operations module 306) (e.g. when a convolution layer is processed in the current hardware pass and either an element-wise layer is not processed in the current hardware pass or an element-wise layer is processed in the current hardware pass but follows an activation layer). The activation module 308 is configured to apply an activation function to the input data and provide the output data back to the element-wise operations module 306 where it is forwarded to the normalisation module 310 directly or after the element-wise operations module 306 processes it. In some cases, the activation function that is applied to the data received by the activation module 308 may vary per activation layer. In these cases, information specifying one or more properties of an activation function to be applied for each activation layer may be stored (e.g. in memory) and the relevant information for the activation layer processed in a particular hardware pass may be provided to the activation module 308 during that hardware pass.

In some cases, the activation module 308 may be configured to store, in entries of a lookup table, data representing the activation function. In these cases, the input data may be used to lookup one or more entries in the lookup table and output values representing the output of the activation function. For example, the activation module 308 may be configured to calculate the output value by interpolating between two or more entries read from the lookup table.

In some examples, the activation module 308 may be configured to operate as a Rectified Linear Unit (ReLU) by implementing a ReLU function. In a ReLU function, the output element $y_{i,j,k}$ is calculated by identifying a maximum value as set out in equation (2) wherein for x values less than 0, y=0:

$$y_{i,j,k} = f(x_{i,j,k}) = \max\{0, x_{i,j,k}\} \quad (2)$$

In other examples, the activation module 308 may be configured to operate as a Parametric Rectified Linear Unit (PReLU) by implementing a PReLU function. The PReLU function performs a similar operation to the ReLU function. Specifically, where $w_1, w_2, b_1, b_2 \in \mathbb{R}$ are constants, the PReLU is configured to generate an output element $y_{i,j,k}$ as set out in equation (3):

$$y_{i,j,k} = f(x_{i,j,k}; w_1, w_2, b_1, b_2) = \max\{(w_1 * x_{i,j,k} + b_1), (w_2 * x_{i,j,k} + b_2)\} \quad (3)$$

The normalisation module 310 is configured to receive one of the following as input data: the original input data for the hardware pass (via the element-wise operations module 306) (e.g. when a convolution layer is not processed in the current hardware pass and neither an element-wise layer nor an activation layer is processed in the current hardware pass); the accumulation output (via the element-wise operations module 306) (e.g. when a convolution layer is processed in the current hardware pass and neither an element-wise layer nor an activation layer is processed in the current hardware pass); and the output data of the element-wise operations module and/or the activation module. The normalisation module 310 then performs a normalisation function on the received input data to produce normalised data. In some cases, the normalisation module 310 may be configured to perform a Local Response Normalisation (LRN) Function and/or a Local Contrast Normalisation (LCN) Function. However, it will be evident to a person of skill in the art that these are examples only and that the normalisation module 310 may be configured to implement any suitable normalisation function or functions. Different normalisation layers may be configured to apply different normalisation functions.

The pooling module 312 may receive the normalised data from the normalisation module 310 or may receive the input data to the normalisation module 310 via the normalisation module 310. In some cases, data may be transferred between the normalisation module 310 and the pooling module 312 via an XBar 318. The term "XBar" is used herein to refer to a simple hardware module that contains routing logic which connects multiple modules together in a dynamic fashion. In this example, the XBar may dynamically connect the normalisation module 310, the pooling module 312 and/or the output interleave module 314 depending on which layers will be processed in the current hardware pass. Accordingly, the XBar may receive information each pass indicating which modules 310, 312, 314 are to be connected.

The pooling module 312 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The output interleave module 314 may receive the normalised data from the normalisation module 310, the input data to the normalisation function (via the normalisation module 310), or the pooled data from the pooling module 312. In some cases, the data may be transferred between the normalisation module 310, the pooling module 312 and the output interleave module 314 via an XBar 318. The output interleave module 314 is configured to perform a rearrangement operation to produce data that is in a predetermined order. This may comprise sorting and/or transposing the received data. The data generated by the last of the layers is provided to the output module 208 where it is converted to the desired output format for the current hardware pass.

The normalisation module 310, the pooling module 312, and the output interleave module 314 may each have access to a shared buffer 320 which can be used by these modules 310, 312 and 314 to write data to and retrieve data from. For example, the shared buffer 320 may be used by these modules 310, 312, 314 to rearrange the order of the received data or the generated data. For example, one or more of these modules 310, 312, 314 may be configured to write data to the shared buffer 320 and read the same data out in a different order. In some cases, although each of the normalisation module 310, the pooling module 312 and the output interleave module 314 have access to the shared buffer 320, each of the normalisation module 310, the pooling module 312 and the output interleave module 314 may be allotted a portion of the shared buffer 320 which only they can access. In these cases, each of the normalisation module 310, the pooling module 312 and the output interleave module 314 may only be able to read data out of the shared buffer 320 that they have written in to the shared buffer 320.

As described above, the modules of the processing module 300 that are used or active during any hardware pass are based on the layers that are processed during that hardware pass. In particular, only the modules or components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the hardware implementation may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first convolution layer needs to be written out to memory before it can be used as an input to the second convolution layer. In each of these hardware passes only the modules, components or engines relevant to a convolution layer, such as the convolution engine 302 and the accumulation buffer 304, may be used or active.

Although the processing module 204 of FIG. 3 illustrates a particular order in which the modules, engines etc. are arranged and thus how the processing of data flows through the processing module, it will be appreciated that this is an example only and that in other examples the modules, engines may be arranged in a different manner. Furthermore, other processing modules may implement additional or alternative types of DNN layers and thus may comprise different modules, engines etc.

Figure 5:
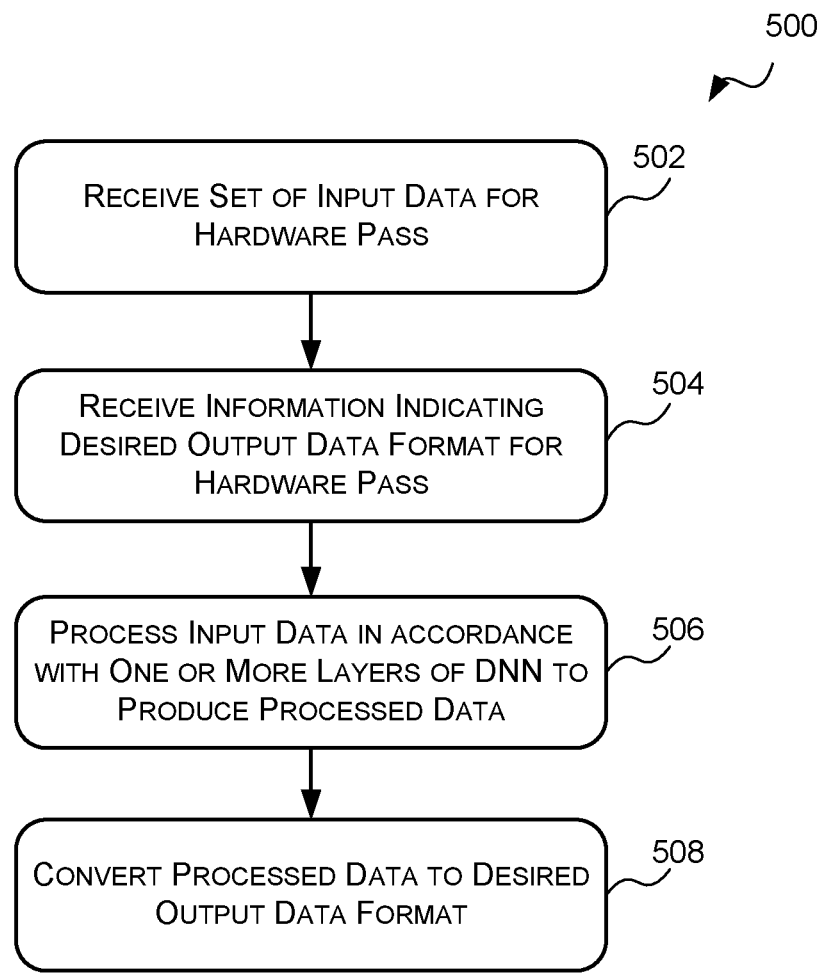
FIG. 5 is a flow diagram of an example method of processing data in the hardware implementation of a DNN in FIG. 2.

Reference is now made to FIG. 5 which illustrates an example method 500 which may be implemented by the hardware implementation of FIG. 2 to process input data in accordance with a DNN. The method 500 begins at block 502 where the hardware implementation receives a set of input data for a hardware pass of the hardware implementation. The set of input data represents at least a portion of input data for a layer of a DNN. As described above, in some cases, the set of input data may be retrieved from external memory. Once the set of input data has been received the method 500 proceeds to block 504.

At block 504, the hardware implementation 200 (e.g. command decoder 206) receives information indicating the desired output data format for the hardware pass. The desired output data format may be a fixed point format or a floating point format. Where the desired output data format is a fixed point format the specific fixed point format may be identified by an exponent and an integer bit length. Where the output data format is a floating point format the specific floating point format may be identified as one of the IEEE floating point formats. The particular output format for a hardware pass is based on the layers to be processed in the hardware pass. As described above, the output data format for each hardware pass of a DNN may be predetermined by software based on, for example, a training data set which is used to predict the output range of each layer of the DNN. The output data format of a particular hardware pass may then be based on the predicted range of the output data for the last layer to be processed in the current hardware pass.

As described above, in some cases the hardware implementation (e.g. command decoder 206) may obtain the output data formats from external memory (e.g. as part of configuration data); and in other cases, the hardware implementation may be preconfigured (e.g. in a register or other local storage device) with the desired output data formats for the hardware passes. Once the hardware implementation 200 receives the information indicating the desired output data format the method 500 proceeds to block 506.

At block 506, the hardware implementation 200 (e.g. processing module 204) processes the received set of input data according to the one or more layers of the DNN associated with the current hardware pass wherein the one or more layers comprises the layer of the DNN to which the input data relates and none, one or more than one subsequent layer. The processing that is performed is thus based on the type of layer(s) that are processed during the current hardware pass. For example, if a convolution layer is processed a convolution is performed on the input data and if an element-wise layer is processed then an element-wise operation is performed on the input data directly or on the input data after it has been processed by another layer. The layer or set of layers that will be processed in each hardware pass is/are typically based on the order of the layers in the DNN and the capabilities of the hardware implementation. As described above, the number of hardware passes to apply a particular DNN to input data and the layers processed in each hardware pass may be predetermined by software. Specifically, the software may divide the layers up into a number of hardware passes based on the order of the layers of the DNN and the size of the input data. Once the hardware implementation (e.g. processing module 204) has processed the received set of input data the method 500 proceeds to block 508.

At block 508, the hardware implementation 200 (e.g. the output module 208) converts the processed data to the desired format for the current hardware pass to generate output data. As described above, in many cases the processed data will be in a fixed point format (e.g. defined by an exponent and an integer bit width) thus where the desired format is also a fixed point format (e.g. defined by an exponent and an integer bit width) converting the processed data to the desired output format may comprise performing a fixed point to fixed point conversion; and where the desired format is a floating point format converting the processed data to the desired output format may comprise performed a fixed point to floating point conversion. The output data (in the desired output data format) may then be stored in memory (e.g. external memory).

Where the last layer processed in the current hardware pass is the last layer of the DNN then the method 500 may end and the output data represents the output data of the DNN. Where, however, the last layer processed in the current hardware pass is not the last layer of the DNN then there are further layers of the DNN to be processed and blocks 502 to 508 are repeated for each of one or more subsequent hardware passes. In these cases, the data output in the current hardware pass becomes the input data for at least one subsequent hardware pass.

As described above, in addition to the hardware implementation supporting a variable output data format (i.e. the format of the output data may vary between hardware passes), the hardware implementation may also support variable internal data formats. The term internal data is used herein to mean any data that is generated or used during a hardware pass and includes the data input into any layer (or any sub-processing module related thereto) and the data output from any layer (or any sub-processing module related thereto). In some cases, any and all of the internal data sets may have a variable format. In other cases, only a subset of the internal data sets may have a variable format.

Where the hardware implementation supports variable internal data formats, in addition to the hardware implementation being configured to receive information identifying a desired output data format for a hardware pass and convert the processed data in the hardware pass to the desired output data format; the hardware implementation may also be configured to receive information identifying a desired internal data format for one or more internal data sets and convert the internal data set to the desired format.

As described above, different layers typically have different input and output ranges. Accordingly, having variable internal data formats allows different layers that are processed during the same hardware pass to use different data formats which can improve the efficiency of the processing of those layers. For example, where a hardware pass is configured to processes a convolution layer and an element-wise layer the hardware implementation may be configured to receive one or more of: information identifying a desired internal input data format for the convolution layer (or part thereof), information identifying a desired internal output data format for the convolution layer (or part thereof), information identifying a desired internal input data format for the element-wise layer, and information identifying a desired internal output data format for the element-wise operation wherein each of these formats is independent of each other.

The hardware implementation may then be configured to convert a corresponding internal data set to the desired format. For example, the hardware implementation may be configured to: convert any data input to the convolution layer to the desired internal input data format for the convolution layer prior to processing the input data; convert any data generated by the convolution layer to the desired internal output data format for the convolution layer prior to providing the output to the element-wise layer; convert any data received as input to the element-wise layer to the desired input data format for the element-wise layer prior to processing the input data; and convert the data generated by the element-wise layer to the desired output data format for the element-wise layer prior to providing the output of the element-wise layer to the output module where it may be further converted to the output-layer format for the hardware pass.

The internal data formats are independent from the output data format for the hardware pass. The internal formats specify the format of data within the hardware implementation whereas the output data format for the hardware pass specifies the format of the data to be output from the hardware implementation for the hardware pass. Accordingly, although the data generated by the last layer of a hardware pass may be ultimately be converted by the output module to the desired output data format for the hardware pass, there may be an internal format for the output data of that layer that may be different than the desired output data format for the hardware pass. For example, data generated by the last layer of a hardware pass may be first converted to an internal output data format, the data in the internal output data format may then be internally (i.e. within the hardware implementation) provided to or transported to the output module where it is converted to the output data format for the hardware pass and ultimately output from the hardware implementation in that format.

Many DNNs are implemented using data in a floating point format, however, performing floating point operations in hardware can be large in silicon area and have significant power consumption due to the complexity of hardware configured to implement floating point calculations, when compared with hardware for implementing corresponding fixed-point calculations. Accordingly, in order to reduce area, power consumption and memory bandwidth of DNN hardware implementations it is desirable for one or more of the layers to be configured to receive and/or generate data in a fixed point format. The fixed point format described above where a set of data is represented with a common exponent and an integer with a certain bit-width has proven particularly effective in reducing the data and improving the efficiency of processing the data. Accordingly, in some embodiments one or more of the desired internal data formats may be a fixed point data format defined by an exponent and an integer bit-width.

A hardware implementation that allows variable internal data formats may also allow different aspects of a layer to be implemented using different formats. For example, in processing modules, such as that shown in FIG. 3, that comprise a convolution engine and an accumulation buffer, which together are used to process or implement a convolution layer, variable internal data formats allows different formats to be used for the convolution and the accumulation. As described above, it is generally beneficial to perform DNN computations in fixed-point formats, however, it has proven difficult to accurately preform accumulation in fixed points, accordingly a hardware implementation that allows variable internal data formats may allow the convolution engine to be a fixed point convolution engine and the accumulation buffer be a floating point accumulator in an efficient manner.

The desired formats for the internal data may be predetermined by software in the same, or similar manner to determining the output data format for a hardware pass. For example, in some cases a training data set or known sample of typical inputs is run through the DNN and the minimum and maximum values of the input and output data of each layer (or part of a layer) are recorded and used to identify the optimum format to represent the range of values defined by the minimum and maximum values. Where the DNN is to be used for vision applications, the input data used to estimate the distribution may take the form of sample input images. Such a method works particularly well when the sample input images comprises a good representative of the expected input data.

Figure 7:
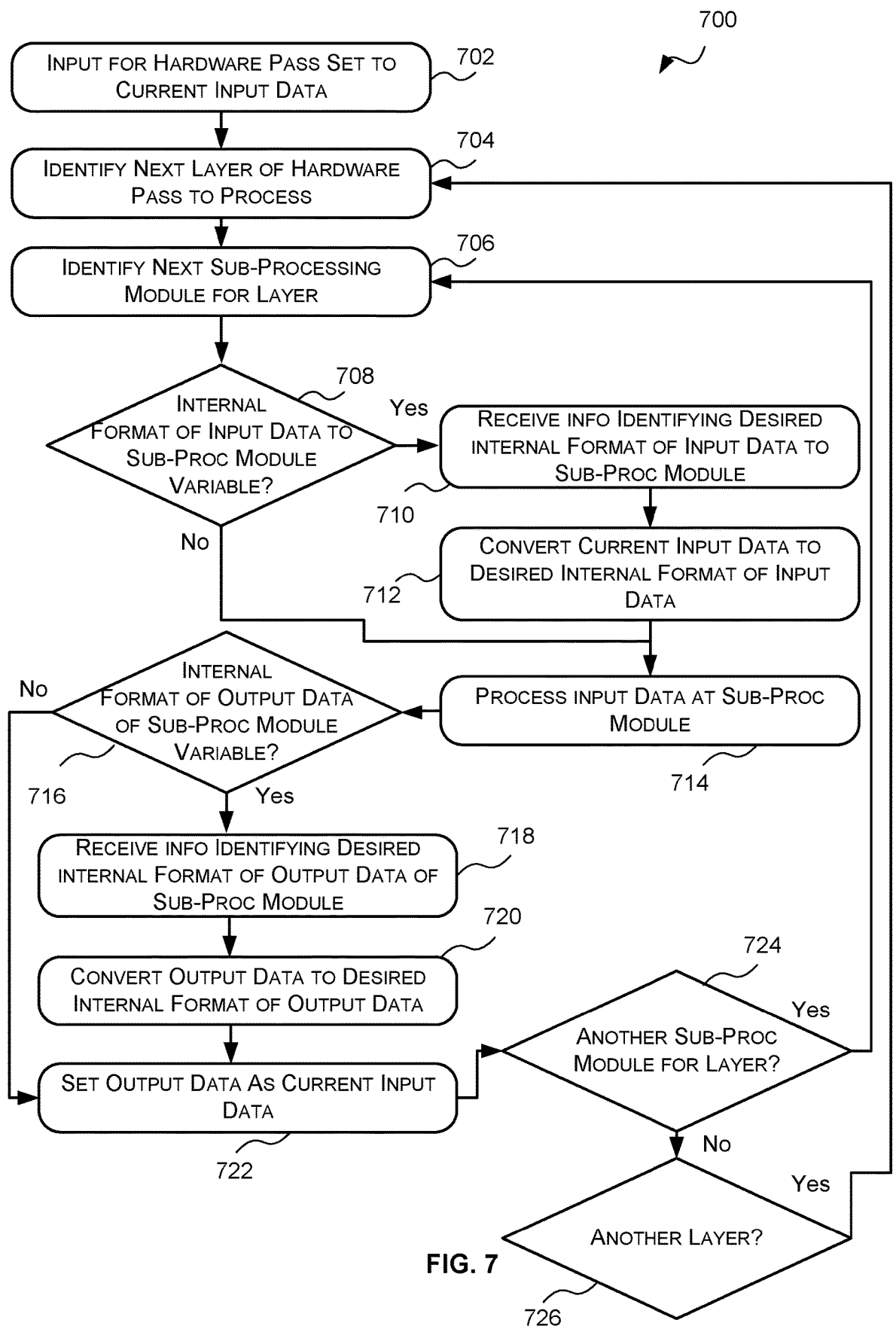
FIG. 7 is a flow diagram of an example method of processing data in the hardware implementation of a DNN of FIG. 6 with variable internal data formats.

Reference is now made to FIG. 7 which illustrates an example method 700 of processing data during a hardware pass with variable internal data formats. Method 700 is an example implementation of block 506 of FIG. 500. The method 700 begins at block 702 where the hardware implementation sets the input data for the hardware pass (e.g. the input data received from the input module) as the current input data. The method 700 then proceeds to block 704 where the hardware implementation identifies the next layer of the hardware pass to be processed. As described above, each hardware pass is associated with one or more layers and the hardware implementation may receive information indicating the layers associated with the current hardware pass and the order thereof. Once the next layer of the hardware pass has been identified the method 700 proceeds to block 706 where the hardware implementation identifies the next hardware module for the identified layer. As described above, a layer may be processed by one or more sub-processing modules. For example, a convolution layer may be processed or implemented by two sub-processing modules—a convolution engine and an accumulation buffer; whereas an element-wise layer may be processed or implemented by a single sub-processing module—an element-wise operations module. Once the next sub-processing module for the current layer has been identified the method 700 proceeds to block 708.

At block 708, the hardware implementation determines whether the internal format for the input data to the identified sub-processing module is variable. If not, the method 700 proceeds directly to block 714. If so, the method 700 proceeds to block 710 where the hardware implementation receives information identifying the desired internal format of input data to the sub-processing module and block 712 where the hardware implementation converts the current input data to the desired internal format of input data. The method 700 then proceeds to block 714 where the input data (converted or un-converted) is processed at the sub-processing module to generate output data. The method 700 then proceeds to block 716.

At block 716, the hardware implementation determines whether the internal format of the output data of the current sub-processing module is variable. If not, then the method 700 proceeds directly to block 722. If yes, then the method 700 proceeds to block 718 where the hardware implementation receives information identifying a desired internal format of the output data to the sub-processing module and block 720 where the hardware implementation converts the output data to the internal format of output data for the sub-processing module. The method 700 then proceeds to block 722 where the output data (converted or unconverted) is set as the current input data. The method 700 then proceeds to block 724.

At block 724 the hardware implementation determines whether there is another sub-processing module for the current layer. As described above, the layers may have one or more than one sub-processing module to process or implement that layer. If there is another sub-processing module for the current layer then the method 700 proceeds back to block 706. If, however, there are no further sub-processing modules for the current layer then the method 700 proceeds to block 726 where the hardware implementation determines whether there is another layer to be processed. If so, the method 700 proceeds back to block 704, otherwise the method 700 ends.

Figure 6:
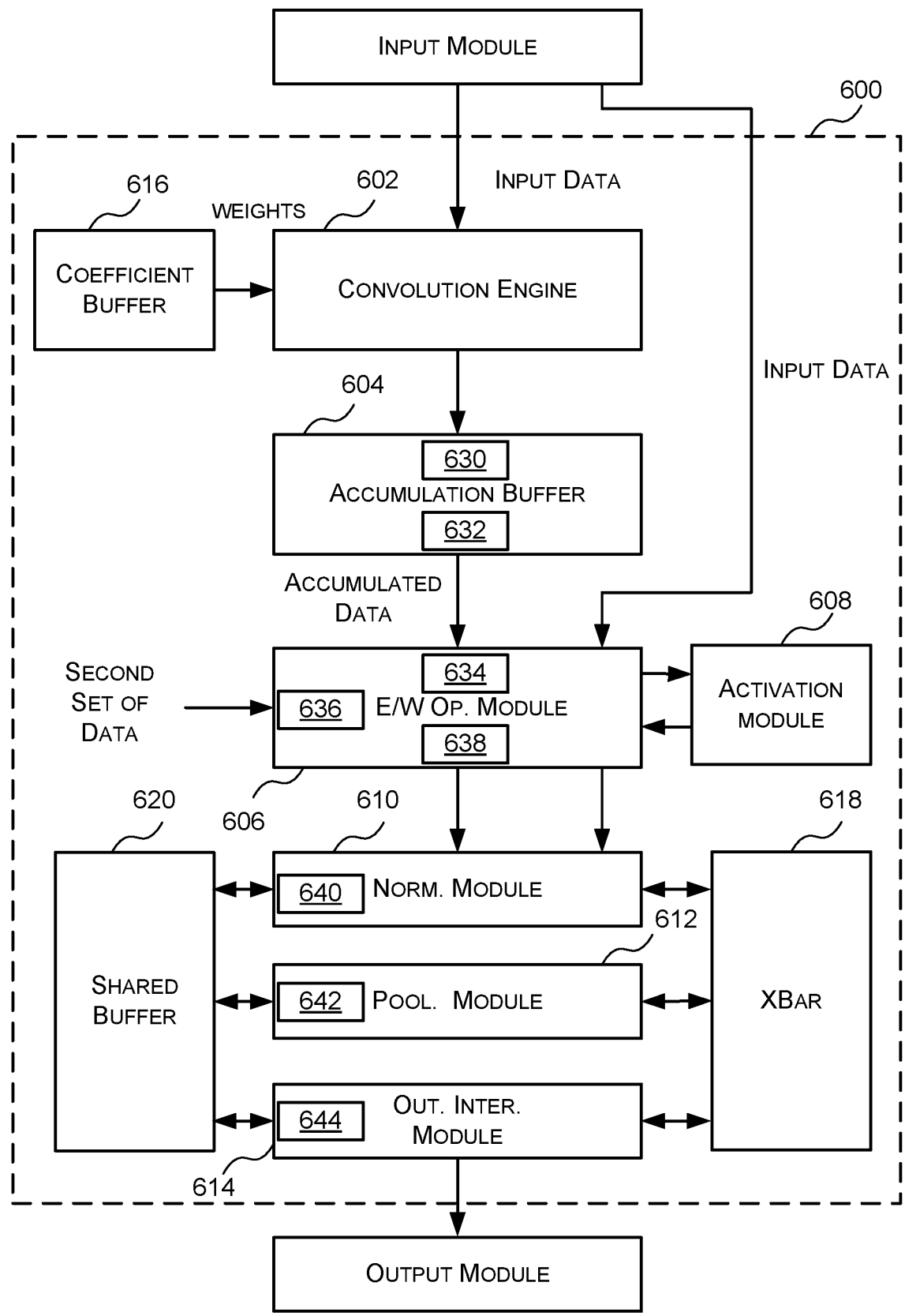
FIG. 6 is a block diagram of a second example processing module of the hardware implementation of a DNN of FIG. 2 with variable internal data formats.

Reference is now made to FIG. 6 which illustrates a second example processing module 600 which is a variant of the processing module 300 of FIG. 3 with variable internal data formats which may be used as the processing module of FIG. 2 in a hardware implementation of a DNN. The processing module 600 comprises a convolution engine 602, an accumulation buffer 604, an element-wise operations module 606, an activation module 608, a normalisation module 610, a pooling module 612, an output interleave module 614 and an XBar 618 which correspond to the convolution engine 302, the accumulation buffer 304, the element-wise operations module 306, the activation module 308, the normalisation module 310, the pooling module 312, the output interleave module 314 and the XBar 318 of the processing module 300 of FIG. 3 except that they may comprise one or more format conversion modules for supporting variable data formats. Specifically, the convolution engine 602, the accumulation buffer 604, the element-wise operations module 606, the activation module 608, the normalisation module 610, the pooling module 612 and the output interleave module 614 of FIG. 6 have all the features and functionality of the corresponding module as shown in FIG. 3 and described above, but one or more of these modules or engines may be configured to convert a data set to a desired format.

FIG. 6 illustrates a number of internal data sets which have a variable format and in which the hardware implementation is configured to perform a conversion of that internal data to a desired format, however, it will be evident to a person of skill that each variable internal data set and corresponding conversion module pair in FIG. 6 is separate from the other variable internal data set and corresponding conversion module pairs in FIG. 6 and thus may be implemented in a hardware implementation of a DNN independently. In other words, hardware implementations of a DNN may comprise any combination of the variable internal data set and corresponding conversion module pairs shown and described with reference to FIG. 6.

The convolution engine 602 receives fixed point data from the input module 202 (e.g. input buffer) and fixed point weights from the coefficient buffer 616 and performs a convolution of the fixed point data and the fixed point weights to produce fixed point output data which is provided to the accumulation buffer 604.

In some examples, the received data may be in a MSB aligned format which means that the exponent of the data it receives is: (INPUT_INTERN_EXPONENT−(HW_PIPELINE_BITDEPTH−INPUT_INTERN_BITDEPTH)) wherein INPUT_INTERN_EXPONENT is the exponent of the data received from the input module (e.g. input buffer), INPUT_INTERN_BITDEPTH is the integer bit depth of the data received from the input module (e.g. input buffer), and HW_PIPELINE_BITDEPTH is the number of bits used by the hardware implementation to transfer data values between modules or engines (in some cases this may be 16 bits); and the received weights may be in a MSB aligned format which mean that the exponent of weights is: (COEFF_MEM_EXPONENT−(HW_PIPELINE_BITDEPTH−COEFF_MEM_WEIGHT_BITDEPTH) where COEFF_MEM_EXPONENT is the exponent of the received weights and COEFF_MEM_WEIGHT_BITDEPTH is the integer bit depth of the received weights. In these cases, the exponent of the output values may be (INPUT_INTER_EXPONENT−(HW_PIPELINE_BITDEPTH−INPUT_INTERN_BITDEPTH))+(COEFF_MEM_EXPONENT−(HW_PIPELINE_BITDEPTH−COEFF_MEM_WEIGHT_BITDEPTH).

The accumulation buffer 604 receives data from the convolution engine 602 and accumulates it. In this example, the accumulation is implemented by a floating point accumulator. Since the data received from the convolution engine is in fixed point format the accumulation buffer 604 comprises a fixed point to floating point converter 630. The fixed point to floating point converter 630 may be configured to receive information indicating the desired internal floating point format for the input to the accumulation buffer 604. In some cases, the information indicating the desired internal floating point format may comprise information indicating which of the IEEE floating point formats is to be used. In some cases, where the format of the input data may also be variable, the fixed to floating point converter 630 may also be configured to receive information (ACCUM_INPUT_EXPONENT) indicating the format of the data received from the convolution engine 602. In some cases, as described above, ACCUM_INPUT_EXPONENT may be equal to (INPUT_INTERN_EXPONENT−(HW_PIPELINE_BITDEPTH−INPUT_INTERN_BITDEPTH))+(COEFF_MEM_EXPONENT−(HW_PIPELINE_BITDEPTH−COEFF_MEM_WEIGHT_BITDEPTH).

Once the fixed point to floating pointer converter 630 converts the data to floating point data the floating point data is added to the current value of the accumulator to generate an updated accumulator value in the desired floating point format. The accumulation buffer 604 repeats this process until all of the values have been accumulated and outputs the data to the element-wise operations module 606.

Since the element-wise operations module 606 expects fixed point data the accumulation buffer 604 also comprises a floating point to fixed point converter 632. The floating point to fixed point converter 632 may be configured to receive information indicating the desired internal fixed format for the output to the accumulation buffer 604. In some cases, the information indicating the desired internal fixed format for the output to the accumulation buffer 604 may indicate an exponent (ACCUM_OUTPUT_EXPONENT) to be used for the fixed point format.

As described above, the element-wise operations module 606 is configured to receive the output of the accumulation buffer 604 or the input data from the input buffer, and optionally receive a second set of data from memory, and performs an element-wise operation on the input data which may involve the second set of data.

To improve the efficiency of the element-wise module 606 the element-wise operations module comprises a first fixed point to fixed point converter 634 to convert the accumulation data received from the accumulation buffer 604 from a fixed point format to a desired internal fixed point format. The first fixed point to fixed point converter 634 may be configured to receive information indicating the desired internal fixed format for the data from the accumulation buffer 604. In some cases, the information indicating the desired internal fixed point format for the data from the accumulation buffer 604 may indicate an exponent (EWO_EXP_CALC_A) to be used for the desired internal fixed point format. Where the data from the accumulation buffer 604 may have a variable format the fixed point to fixed point converter 634 may also receive information indicating the format of the data received from the accumulation buffer 604. In some cases, the information indicating the format of the data received from the accumulation buffer may indicate the exponent (EWO_EXP_IN_A) of the received data.

The element-wise operations module 606 may also comprise a second fixed point to fixed point converter 636 to convert the second set of data received from memory from a fixed point format to a desired internal fixed point format. The fixed point to fixed point converter 636 may be configured to receive information indicating the desired internal fixed format for the data from memory. In some cases, the information indicating the desired internal fixed format for the data from memory may indicate an exponent (EWO_EXP_CALC_B) to be used for the desired internal fixed point format. Where the data from the memory may have a variable format the fixed point to fixed point converter 636 may also receive information indicating the format of the data received from memory. In some cases, the information indicating the format of the data received from the accumulation buffer may indicate the exponent (EWO_EXP_IN_B) of the received data.

The element-wise operations 606 may also comprise a third fixed point to fixed point converter 638 to convert the processed data (after the bit-wise operation) from a fixed point format to a desired internal fixed point format. The fixed point to fixed point converter 638 may be configured to receive information indicating the desired internal fixed format for the processed data. In some cases, the information indicating the desired internal fixed point format for the data from memory may indicate an exponent (EWO_EXP_OUT) to be used for the desired internal fixed point format.

The operation of the fixed point to fixed point converters 634, 636, 638 of the element-wise operations module 606 may be based on which element-wise operation is performed. For example, where the element-wise operation is an add, maximum or minimum operation then preferably both inputs (the input from the accumulation buffer/input from the input module (e.g. input buffer); and the input from memory) are converted to the same format and the result is also to be in the same format. Accordingly, when the element-wise operation performed by the element-wise operations module 606 is an add, maximum, or minimum operation, preferably the following are true:
  EWO_EXP_IN_A=ACCUM_OUTPUT_EXPONENT|
      IINPUT_INTERN_EXPONENT|ACTIVATION_LU-
      T_EXP depending on where the data was received from
  EWO_EXP_IN_B is the exponent used when the data was written to memory (e.g. in an earlier hardware pass)
  EWO_EXP_CALC_A=EWO_EXP_CALC_B=EWO_EXP_CALC_RESULT
  EWO_EXP_OUT can be any suitable value Where, however, the element-wise operation performed by the element-wise operations module 606 is a multiply operation preferably the inputs to the multiplier are not changed and the exponent of the result is the sum of the exponents of the two inputs. Accordingly, when the element-wise operation performed by the element-wise operations module 606 is a multiplication, preferably the following are true:
  EWO_EXP_IN_A=ACCUM_OUTPUT_EXPONENT|
      INPUT_INTERN_EXPONENT|ACTIVATION-
      _LUT_ EXPONENT depending on where the data was received from
  EWO_EXP_IN_B is the exponent used when the data was written to memory (e.g. in an earlier hardware pass)
  EWO_EXP_CALC_A=EWO_EXP_IN_A
  EWO_EXP_CALC_B=EWO_EXP_IN_B
  EWO_EXP_CALC_RESULT=EWO_EXP_CALC_A+EWO_EXP_CALC_B
  EWO_EXP_OUT can be any suitable value In some cases, the element-wise operation performed by the element-wise operations module 606 is a combination operation—e.g. an add operation followed by a multiply operation (ADD_MULT) or a multiply operation followed by an add operation (MULT_ADD). In these cases, preferably the above rules are followed such that for a MULT_ADD operation, the exponents for the two inputs to the multiplication are preferably not changed; the exponent for the second input to the adder is converted to the sum of the exponents of the other two inputs; and the exponent of the result is set to the same value. Similarly, for a ADD_MULT operation the exponents for the two inputs to the adder are preferably converted to the same value; the exponent for the second input to the multiplier is not changed; and the exponent of the result is set to the sum of the exponents of the adder and the exponent of the second input to the multiplier.

As described above, the normalisation module 610, the pooling module 612 and the output interleave module 614 are capable of writing data to and reading data from the shared buffer 620. In some cases, the data written into the shared buffer 620 can be packed at multiple different bit depths in order to trade off the number of data elements that can be stored into the available buffer space against the precision of the data stored. Accordingly, each of the normalisation module 610, the pooling module 612 and the output interleave module 614 may comprise a clamp module 640, 642, 644 which is used to clamp the data to the desired format (e.g. bit depth). Each clamp module 640, 642, 644 may be configured to receive information indicating the bit-depth that is to be used and the clamp module 640, 642, 644 uses this information to determine how to format the data for storage in the shared buffer 620. In one example, the information indicating the desired format of the data is a BE_PK signal which may be set to one of 0, 1 and 2 and when BE_PK is set to 0 it indicates that 16-bit values are stored and when the data values are 16-bits causes the clamp module 640, 642, 644 to leave the data as is; when BE_PK is set to 1 it indicates that 2×8-bit values are packed together and when the data values are 16-bits causes the clamp module 640, 642, 644 to clamp the 16-bit data values to 8-bits, retaining the 8 least significant bits; and when BE_PK is 2 it indicates that 4×4 bit values are packed together and when the data values are 16-bits cause the clamp module 640, 642, 644 to clamp the 16-bit data values to 4 bits, retaining the four least significant bits. In this example the clamp modules 640, 642, 644 do not modify the exponent of the data.

Figure 8:
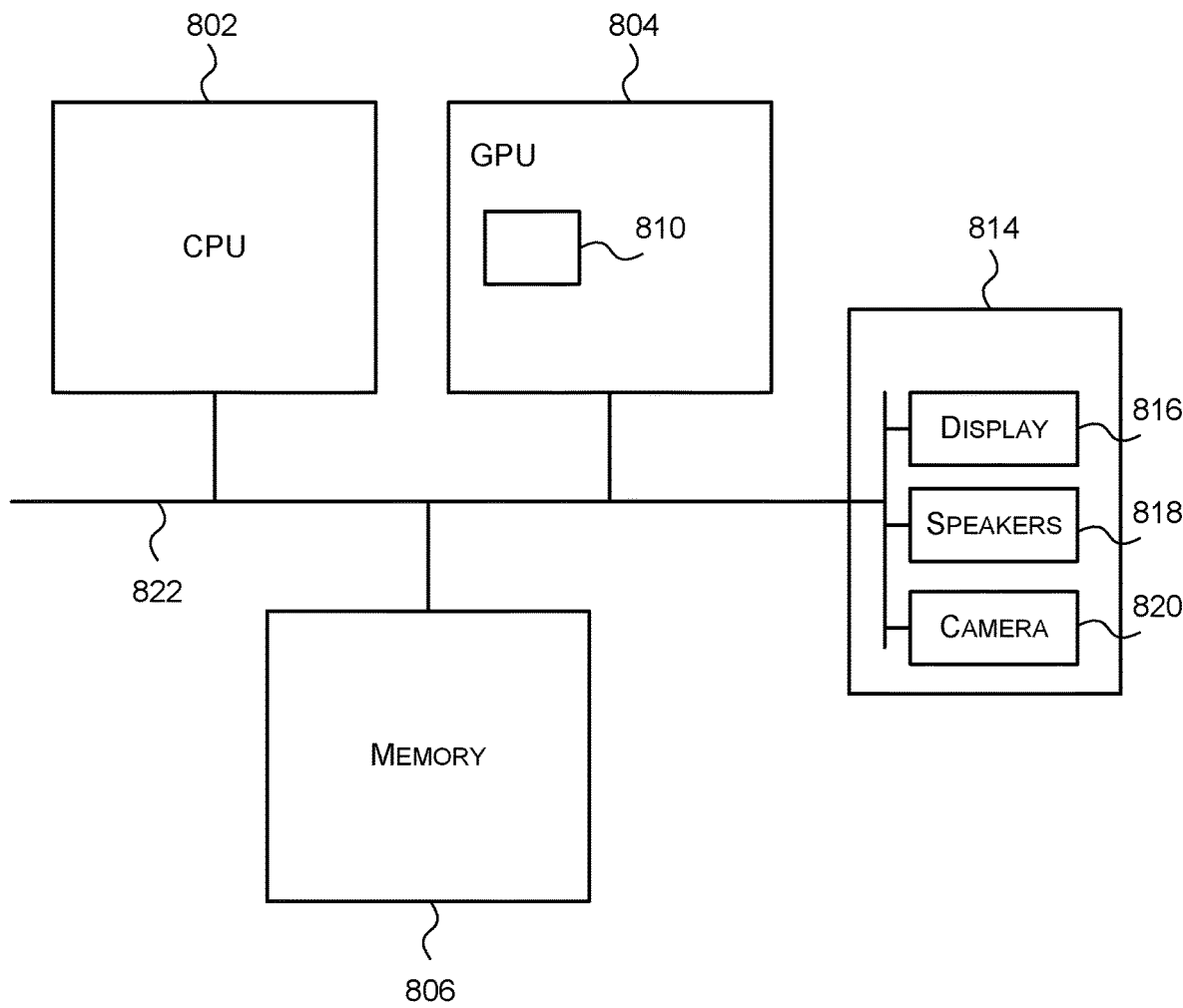
FIG. 8 is a block diagram of an example computer system in which the hardware implementation of a DNN described herein is implemented.

FIG. 8 shows a computer system in which the hardware implementations for a DNN described herein may be implemented. The computer system comprises a CPU 802, a GPU 804, a memory 806 and other devices 814, such as a display 816, speakers 818 and a camera 820. A hardware implementation of a DNN 810 (corresponding to the hardware implementation of a DNN 200) may be implemented on the GPU 804, as shown in FIG. 8. In other examples, the processing block 810 may be implemented independent from the CPU or the GPU and may have a separate connection to a communications bus 822. In some examples, there may not be a GPU and the CPU may provide control information to the hardware implementation 810. The components of the computer system can communicate with each other via the communications bus 822.

The hardware implementation of a DNN and processing modules of FIGS. 2, 3 and 6 are shown as comprising a number of functional blocks. This is schematic only and is not intended to define a strict division between different logic elements of such entities. Each functional block may be provided in any suitable manner. It is to be understood that intermediate values described herein as being formed by a hardware implementation of a DNN or a processing module need not be physically generated by the hardware implementation of a DNN or the processing module at any point and may merely represent logical values which conveniently describe the processing performed by the hardware implementation of a DNN or the processing module between its input and output.

The hardware implementation of a DNN and the processing modules described herein may be embodied in hardware on an integrated circuit. The hardware implementations of a DNN described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware implementation of a DNN configured to perform any of the methods described herein, or to manufacture a hardware implementation of a DNN comprising any apparatus described herein. An integrated circuit definition dataset may be, for example, an integrated circuit description.

Therefore, there may be provided a method of manufacturing, at an integrated circuit manufacturing system, a hardware implementation of a DNN as described herein. Furthermore, there may be provided an integrated circuit definition dataset that, when processed in an integrated circuit manufacturing system, causes the method of manufacturing a hardware implementation of a DNN to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware implementation of a DNN will now be described with respect to FIG. 9.

Figure 9:
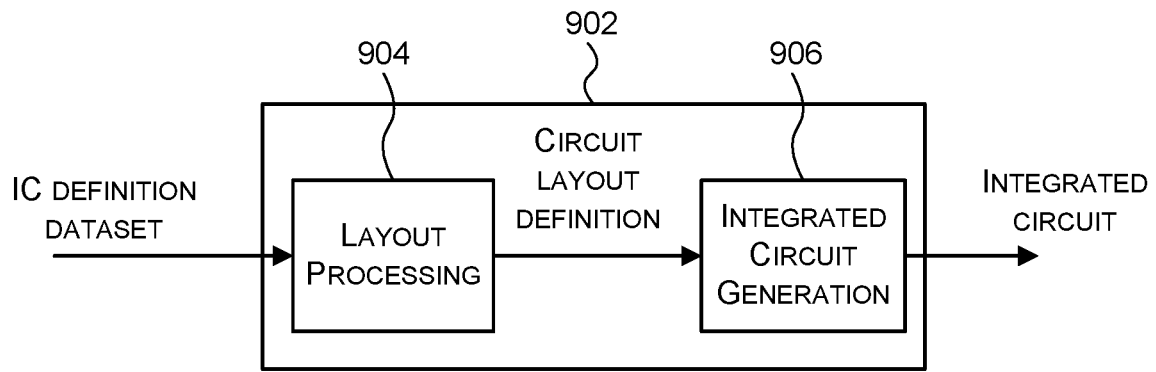
FIG. 9 is a block diagram of an example integrated circuit manufacturing system for generating an integrated circuit embodying a hardware implementation of a DNN as described herein.

FIG. 9 shows an example of an integrated circuit (IC) manufacturing system 902 which is configured to manufacture a hardware implementation of a DNN as described in any of the examples herein. In particular, the IC manufacturing system 902 comprises a layout processing system 904 and an integrated circuit generation system 906. The IC manufacturing system 902 is configured to receive an IC definition dataset (e.g. defining a hardware implementation of a DNN as described in any of the examples herein), process the IC definition dataset, and generate an IC according to the IC definition dataset (e.g. which embodies a hardware implementation of a DNN as described in any of the examples herein). The processing of the IC definition dataset configures the IC manufacturing system 902 to manufacture an integrated circuit embodying a hardware implementation of a DNN as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware implementation of a DNN without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method in a hardware implementation of a Deep Neural Network (DNN) configured to implement the DNN by processing data using one or more hardware passes, wherein during each hardware pass the hardware implementation receives at least a portion of input data for a layer of the DNN and processes the received input data in accordance with at least that layer to produce processed data, the method comprising:
- receiving, at an input module of the hardware implementation, a set of input data for a hardware pass of the hardware implementation, the set of input data representing at least a portion of input data for a particular layer of the DNN;
- receiving, at a decoder of the hardware implementation, information indicating a desired output data format for the hardware pass;
- processing, at a processing module of the hardware implementation, the set of input data according to one or more layers of the DNN associated with the hardware pass to produce processed data, the one or more layers comprising the particular layer of the DNN, the processing module comprising a plurality of sub-processing modules, each sub-processing module of the plurality of sub-processing modules configured to perform all or part of the processing of one type of layer, at least one of the plurality of sub-processing modules comprising a format conversion module configured to receive information indicating a format of input data to the corresponding sub-processing module and receive information indicating a desired internal data format for the hardware pass, the desired internal data format for the hardware pass being independent from the desired output data format for the hardware pass, wherein processing the set of input data according to the one or more layers of the DNN associated with the hardware pass comprises generating an internal data set and converting, using the format conversion module of one of the at least one sub-processing module, the internal data set from the format of the input data to the sub-processing module into the desired internal data format for the hardware pass prior to processing that internal data set at the one of the at least one sub-processing module, the internal data set being data within the hardware implementation; and
- converting, at an output module of the hardware implementation, the processed data into the desired output data format for the hardware pass to produce output data for the hardware pass.

2. A non-transitory computer readable storage medium having stored thereon computer readable instructions that, when executed at a computer system, cause the computer system to perform the method as set forth in claim 1.

3. A hardware implementation of a Deep Neural Network (DNN) configured to implement the DNN by processing data using one or more hardware passes, wherein during each hardware pass the hardware implementation receives at least a portion of input data for a layer of the DNN and processes the received input data in accordance with at least that layer to produce processed data, the hardware implementation comprising:
- an input module configured to receive a set of input data for a hardware pass of the hardware implementation, the set of input data representing at least a portion of input data for a particular layer of the DNN;
- a decoder configured to receive information indicating a desired output data format for the hardware pass;
- a processing module configured to process the set of input data according to one or more layers of the DNN associated with the hardware pass to produce processed data, the one or more layers comprising the particular layer of the DNN, the processing module comprising a plurality of sub-processing modules, each sub-processing module of the plurality of sub-processing modules configured to perform all or part of the processing of one type of layer, at least one of the plurality of sub-processing modules comprising a format conversion module configured to receive information indicating a format of input data to the corresponding sub-processing module and receive information indicating a desired internal data format for the hardware pass, the desired internal data format for the hardware pass being independent from the desired output data format, wherein processing the set of input data according to the one or more layers of the DNN associated with the hardware pass comprises generating an internal data set and converting, using the format conversion module of one of the at least one sub-processing module, the internal data set from the format of the input data to the corresponding sub-processing module into the desired internal data format for the hardware pass prior to processing the internal data set at the one of the at least one sub-processing module, the internal data set being data within the hardware implementation; and
- an output module configured to convert the processed data into the desired output data format for the hardware pass to produce output data for the hardware pass.

4. The hardware implementation of claim 3, wherein:
- the input module is further configured to receive a second set of input data for a different hardware pass of the hardware implementation;
- the decoder is further configured to receive information indicating a desired output data format for the different hardware pass, the desired output data format for the different hardware pass being different from the desired output data format for the hardware pass;
- the processing module is further configured to process the second set of input data according to one or more layers of the DNN associated with the different hardware pass to produce second processed data; and
- the output module is further configured to convert the second processed data into the desired output data format for the different hardware pass to produce second output data.

5. The hardware implementation of claim 4, wherein the second set of input data comprises a portion of input data for the particular layer of the DNN; or wherein the second set of input data comprises at least a portion of input data for another layer of the DNN.

6. The hardware implementation of claim 5, wherein the second set of input data comprises a least a portion of input data for another layer and the second set of input data comprises at least a portion of the output data in the desired output data format for the hardware pass.

7. The hardware implementation of claim 3, wherein the output module is further configured to store the output data in the desired output data format for the hardware pass in memory; and the input module is further configured to read the output data in the desired output data format for the hardware pass from memory as a set of input data for another hardware pass.

8. The hardware implementation of claim 3, wherein the one or more layers of the DNN associated with the hardware pass comprises at least two layers and the processing module is configured to process the set of input data according to the at least two layers by processing the set of input data according to one layer of the at least two layers using a first input data format and processing the set of input data according to another layer of the at least two layers using a second input data format wherein the first input data format and the second input data format are independent from the desired output data format for the hardware pass.

9. The hardware implementation of claim 8, wherein each of the first and second input data formats is a fixed point format defined by an exponent and an integer bit-width and the exponent of the first data format is different than the exponent of the second data format.

10. The hardware implementation of claim 8, wherein the processing module is configured to process the input data according to one layer of the at least two layers using a first input data format by converting input data to that layer into the first input data format using a fixed point to fixed point converter.

11. The hardware implementation of claim 3, wherein the processing module is configured to process the set of input data according to one or more layers by performing at least a first operation and a second operation on the set of input data wherein the first operation is performed using a first data format and the second operation is performed using a second, different, data format.

12. The hardware implementation of claim 11, wherein the first data format is a fixed point data format and the second data format is a floating point data format; and the processing module is configured to perform the second operation on the set of input data using the second data format by converting fixed point input data into floating point input data, performing the second operation on the floating point input data to produce floating point output data, and converting the floating point output data to fixed point output data.

13. The hardware implementation of claim 3, wherein the decoder is further configured to receive information indicating a format of the set of input data for the hardware pass; and wherein the processing module is configured to process the set of input data according to the one or more layers of the DNN associated with the hardware pass based on the indicated format of the set of input data.

14. The hardware implementation of claim 13, wherein the format of the set of input data for the hardware pass is a fixed point format defined by an exponent and an integer bit-length; and/or wherein the desired output data format for the hardware pass is different than the format of the set of input data for the hardware pass.

15. The hardware implementation of claim 3, wherein the desired output data format for the hardware pass is a fixed point format defined by an exponent and an integer bit-length.

16. The hardware implementation of claim 3, wherein the decoder is further configured to receive information indicating a format of one or more weights associated with one of the one or more layers of the DNN associated with the hardware pass; and the processing module is configured to process the set of input data according to that layer based on the indicated format of the one or more weights.

17. The hardware implementation of claim 16, wherein the format of the one or more weights associated with the layer of the one or more layers is a fixed point format that is defined by an exponent and an integer bit-length; wherein the information indicating a format of one or more weights indicates a different format for at least two weights associated with the layer of the one or more layers; and/or wherein a format of one or more weights associated with a different layer is different than the format of the one or more weights associated with the one layer of the one or more layers of the DNN.

18. The hardware implementation of claim 3, wherein the desired output data format for the hardware pass is based on an expected output data range for a last layer of the one or more layers of the DNN associated with the hardware pass.

19. The hardware implementation of claim 3, wherein the information indicating a desired output data format for the hardware pass indicates a different desired output data format for at least two portions of the processed data.

20. A non-transitory computer readable storage medium having stored thereon a computer readable description of an integrated circuit that, when processed in an integrated circuit manufacturing system, causes the integrated circuit manufacturing system to manufacture a hardware implementation of a Deep Neural Network (DNN) configured to implement the DNN by processing data using one or more hardware passes, wherein during each hardware pass the hardware implementation receives at least a portion of input data for a layer of the DNN and processes the received input data in accordance with at least that layer to produce processed data, the hardware implementation comprising:

an input module configured to receive a set of input data for a hardware pass of the hardware implementation, the set of input data representing at least a portion of input data for a particular layer of the DNN;

a decoder configured to receive information indicating a desired output data format for the hardware pass;

a processing module configured to process the set of input data according to one or more layers of the DNN associated with the hardware pass to produce processed data, the one or more layers comprising the particular layer of the DNN, the processing module comprising a plurality of sub-processing modules, each sub-processing module of the plurality of sub-processing modules configured to perform all or part of the processing of one type of layer, at least one of the plurality of sub-processing modules comprising a format conversion module configured to receive information indicating a format of input data to the corresponding sub-processing module and receive information indicating a desired internal data format for the hardware pass, the desired internal data format for the hardware pass being independent from the desired output data format, wherein processing the set of input data according to the one or more layers of the DNN associated with the hardware pass comprises generating an internal data set and converting, using the format conversion module of one of the at least one sub-processing module, the internal data set from the format of the input data to the corresponding sub-processing module into the desired internal data format for the hardware pass prior to processing the internal data set at the one of the at least one sub-processing module, the internal data set being data within the hardware implementation; and an output module configured to convert the processed data into the desired output data format for the hardware pass to produce output data for the hardware pass.

* * * * *